United States Patent
Matsudaira et al.

(10) Patent No.: US 9,304,906 B2
(45) Date of Patent: Apr. 5, 2016

(54) MEMORY SYSTEM, CONTROLLER AND CONTROL METHOD OF MEMORY

(71) Applicant: Kabushiki Kaisha Toshiba, Minato-ku (JP)

(72) Inventors: Hiroki Matsudaira, Funabashi (JP); Takashi Hirao, Ota-ku (JP); Aurelien Nam Phong Tran, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 193 days.

(21) Appl. No.: 14/200,625

(22) Filed: Mar. 7, 2014

(65) Prior Publication Data

US 2015/0074335 A1 Mar. 12, 2015

Related U.S. Application Data

(60) Provisional application No. 61/875,830, filed on Sep. 10, 2013.

(51) Int. Cl.
*G06F 12/00* (2006.01)
*G06F 12/02* (2006.01)
*G06F 3/06* (2006.01)
*G06F 13/16* (2006.01)

(52) U.S. Cl.
CPC ............ *G06F 12/0246* (2013.01); *G06F 3/064* (2013.01); *G06F 3/0628* (2013.01); *G06F 3/0652* (2013.01); *G06F 3/0679* (2013.01); *G06F 3/0688* (2013.01); *G06F 12/0238* (2013.01); *G06F 12/0292* (2013.01); *G06F 13/1668* (2013.01)

(58) Field of Classification Search
CPC ..... G06F 3/0628; G06F 3/064; G06F 3/0652; G06F 3/0679; G06F 3/0688; G06F 12/0246; G06F 12/0238; G06F 12/0292; G06F 13/1668

USPC ........ 711/103, 152, 163, 170; 710/10, 23, 34, 710/55; 712/14, 225
See application file for complete search history.

(56) References Cited

U.S. PATENT DOCUMENTS

| | | | |
|---|---|---|---|
| 8,166,233 B2 | 4/2012 | Schibilla et al. | |
| 8,171,254 B2 | 5/2012 | Takamiya et al. | |
| 8,392,476 B2 | 3/2013 | Asano et al. | |
| 2009/0154254 A1* | 6/2009 | Wong | G06F 12/0246 365/185.29 |
| 2012/0089765 A1* | 4/2012 | Huang | G06F 3/061 711/103 |
| 2012/0311235 A1* | 12/2012 | Masuo | G06F 12/0246 711/103 |
| 2013/0019057 A1* | 1/2013 | Stephens | G06F 12/00 711/103 |
| 2013/0246716 A1* | 9/2013 | Kato | G06F 3/064 711/148 |
| 2014/0032820 A1* | 1/2014 | Harasawa | G06F 12/0246 711/103 |

FOREIGN PATENT DOCUMENTS

| | | |
|---|---|---|
| JP | 2011-159044 | 8/2011 |
| JP | 2011-192260 | 9/2011 |

\* cited by examiner

*Primary Examiner* — Reba I Elmore
(74) *Attorney, Agent, or Firm* — Oblon, McClelland, Maier & Neustadt, L.L.P.

(57) ABSTRACT

According to one embodiment, a memory system includes non-volatile memory, a block management table that stores whether data in the non-volatile memory is valid or invalid in a unit of cluster, and a controller configured to execute compaction. In the block management table, first information related to likelihood that valid data within the block is invalidated is registered for each of the blocks. The controller is configured to select a block to be a target of the compaction based on the first information and use the selected block to execute the compaction.

20 Claims, 8 Drawing Sheets

FIG.3

BLOCK MANAGEMENT TABLE 21

| Block Number | VALID CLUSTER NUMBER | IMMEDIATELY-PREVIOUS INVALID CLUSTER NUMBER |
|---|---|---|
| 1 | a1 | b1 |
| 2 | a2 | b2 |
| ⋮ | ⋮ | ⋮ |

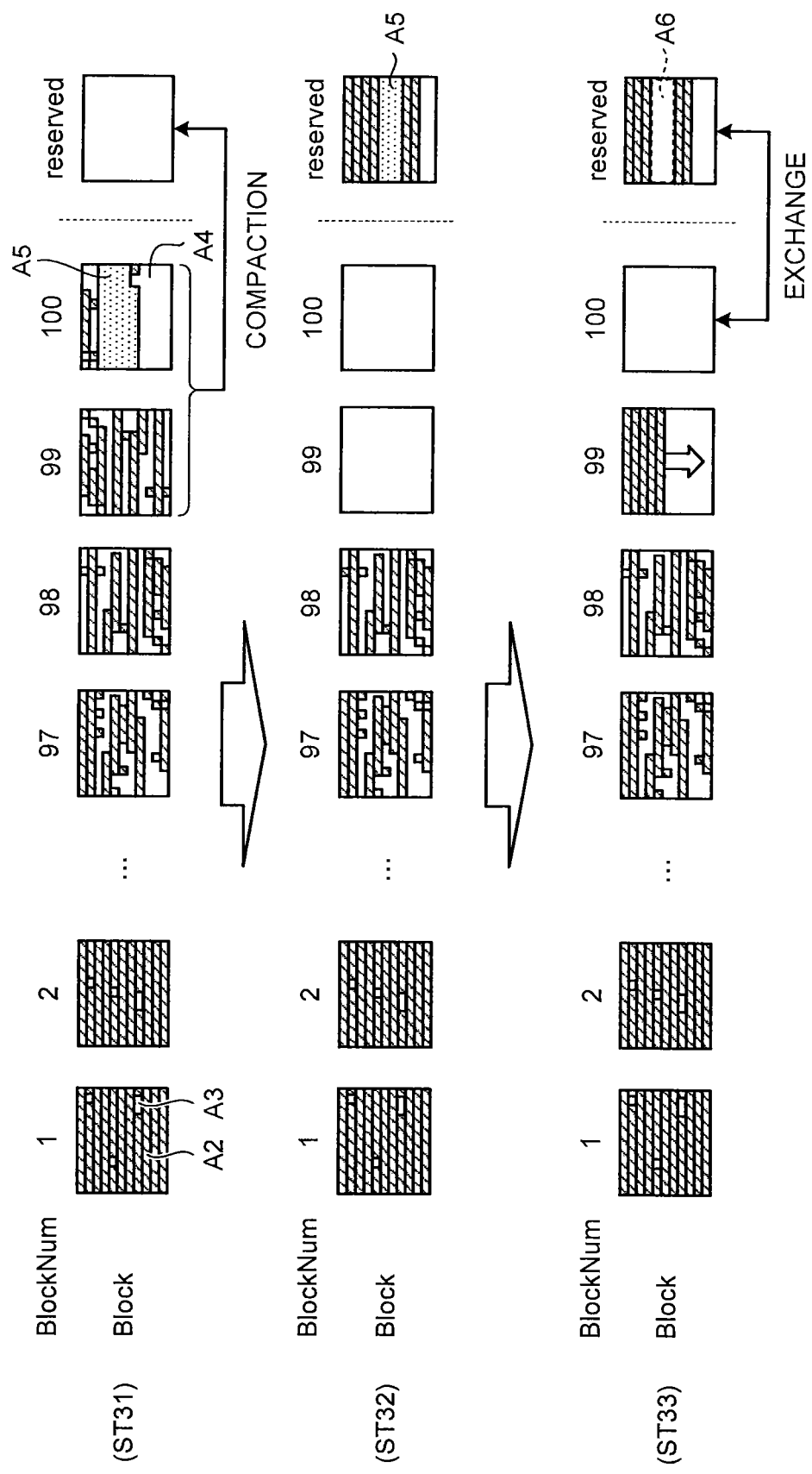

MEMORY SYSTEM, CONTROLLER AND CONTROL METHOD OF MEMORY

CROSS-REFERENCE TO RELATED APPLICATIONS

This application is based upon and claims the benefit of priority from U.S. Provisional Application No. 61/875,830, filed on Sep. 10, 2013; the entire contents of which are incorporated herein by reference.

FIELD

Embodiments described herein relate generally to a memory system, a controller, and a control method of a memory system.

BACKGROUND

When non-volatile memory (such as flash memory) deletes written data, deletion-target data is invalidated while the written data remains. Therefore, if write and deletion of data are repeated, fragmented unwanted regions (invalidated regions) are left. Used regions are non-sequentially held. A process that erases data from this unwanted region and collects the used regions as consecutive regions is referred to as compaction or garbage collection.

The compaction requires a long processing time. The compaction and access to user data are not simultaneously performed. Therefore, when access to user data is tried during execution of the compaction, the access time becomes long compared with normal operation. Accordingly, reduction in the number of compactions is preferred.

BRIEF DESCRIPTION OF THE DRAWINGS

FIG. 3 is a diagram illustrating an exemplary configuration of a block management table;
FIG. 8 is a diagram for describing the compaction-block selection process in the case where the block with the cluster that is likely to be invalidated is not excluded from the compaction targets.

DETAILED DESCRIPTION

According to one embodiment, a memory system is provided. The memory system includes non-volatile memory that includes a plurality of blocks as a unit of data erase. Each one of the plurality of blocks include a plurality of pages as a unit of data write and read. The memory system further includes a block management table that stores whether data in the non-volatile memory is valid or invalid in a unit of cluster. The cluster is natural number times as large as a unit of sector. The natural number is equal to or more than two. The unit of sector is a minimum access unit from a host. A size of the cluster is smaller than a size of the block. The memory system further includes a controller configured to: manage data stored in the non-volatile memory based on the block management table; and execute compaction based on the block management table. The compaction is a process that reads out a valid cluster from the block and rewrites the valid cluster to an erased block. In the block management table, for each of the blocks, first information related to likelihood that valid data within the block is invalidated is registered. Furthermore, the controller is configured to select a block to be a target of the compaction based on the first information and use the selected block to execute the compaction.

Exemplary embodiments of a memory system, a controller, and a control method of a memory system will be explained below in detail with reference to the accompanying drawings. The present invention is not limited to the following embodiments.

EMBODIMENT

Figure 1:
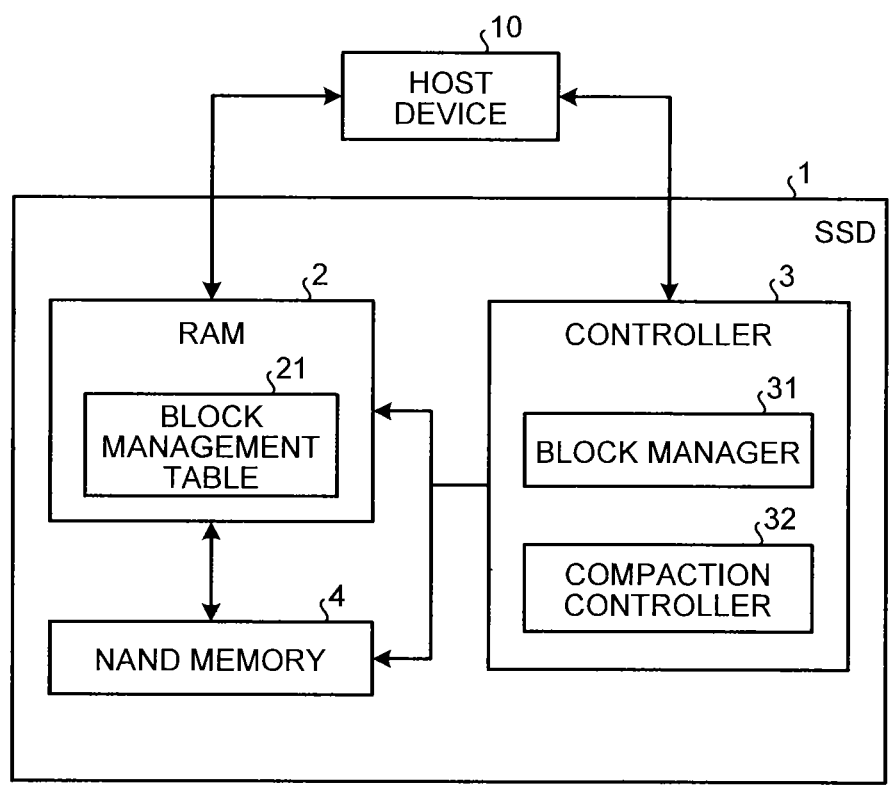
FIG. 1 is a block diagram illustrating a configuration of a memory system according to an embodiment.

FIG. 1 is a block diagram illustrating a configuration of a memory system according to an embodiment. As a semiconductor storage device (a memory system), a solid state drive (SSD) 1 is an external memory used in a computer system, and is coupled to a host device 10.

The SSD 1 includes random access memory (RAM) 2, NAND memory 4 (non-volatile memory) that actually stores data, and a controller 3. The SSD 1 of this embodiment performs compaction (garbage collection) by using data with a low likelihood of being invalidated.

The compaction is a process that reads out valid data stored in the NAND memory 4 to a predetermined buffer region (a new block) and writes the valid data, which is read out to this buffer region, to the NAND memory 4. In other words, the compaction is a process that moves a valid cluster group from a first block group to a second block so as to collect the valid data in an erased block.

The RAM 2 is coupled to the host device 10, the controller 3, and the NAND memory 4. The NAND memory 4 is coupled to the controller 3 and the RAM 2. The controller 3 is coupled to the host device 10, the RAM 2, and the NAND memory 4.

The RAM 2 is a memory such as SRAM, DRAM, and FeRAM. The RAM 2 temporarily stores data transmitted from the host device 10, and transmits the stored data to the NAND memory 4. When data corresponding to a read request from the host device 10 is read out from the NAND memory 4, the RAM 2 temporarily stores the read data. The data that is read out from the NAND memory 4 and temporarily stored in the RAM 2 is transmitted to the host device 10.

The RAM 2 stores, for example, a block management table 21 and a read/write buffer (not illustrated). The block management table 21 is loaded from the NAND memory 4 to the RAM 2 at a predetermined timing, for example, at start-up of the SSD 1.

The block management table 21 is a table for managing each block within the NAND memory 4. In the block management table 21, information related to likelihood that valid data within the block is invalidated is registered for each block.

A block is a unit (size) for batch erasing in the NAND memory 4. A cluster is a unit of management for managing "small data" within the SSD 1. A cluster size is equal to or more than a sector size and equal to or less than a block size. The block size is a size that is natural number times as large as the cluster size. A sector is the minimum access unit from the host device 10. The sector size is, for example, 512 B.

In the case where the valid or invalid state of the cluster is updated in association with data write, data deletion, or similar operation within the NAND memory 4, the block management table 21 loaded to the RAM 2 is updated. An invalid cluster (data) is a cluster that is no longer referred due to overwriting of data corresponding to an LBA (LCA). A valid cluster is a cluster associated with an LBA.

In other words, the valid state indicates that the written data exists within the cluster and this data is valid. The invalid state indicates that the case where no data is written within the cluster or the case where data preliminary written within the cluster becomes invalid (the case where the latest data sets with the same LBA are written).

The block management table 21 stores the number of valid clusters among the clusters in each block (the valid cluster count). In the block management table 21, a Block Number (identification information of the block), the valid cluster count, and the cluster count of clusters that have been invalid immediately prior to the compaction (after the predetermined timing) (immediately prior clusters that have been invalidated) are associated with one another.

The SSD 1 of this embodiment selects a block of a compaction target (organizing target) based on the cluster count of the clusters (clusters just invalidated) that has been invalid immediately prior to the compaction (after the predetermined timing). Hereinafter, a cluster that becomes invalid immediately prior to the compaction (during the period from the predetermined timing to the beginning of the compaction) is referred to as an immediately-previous invalid cluster. The number of the immediately-previous invalid clusters is referred to as the immediately-previous invalid cluster count.

In the case where an immediately-previous invalid cluster exists, the peripheral clusters have high likelihood of being invalidated next. In other words, in the case where some cluster is invalidated, peripheral clusters of this cluster have high likelihood of being invalidated in a short time. Accordingly, a block with a higher immediately-previous invalid cluster count includes more clusters that have high likelihood of being invalidated in a short time. Accordingly, the SSD 1 of this embodiment excludes a block with a high immediately-previous invalid cluster count from the compaction targets.

The controller 3 retrieves the block management table 21 stored in the NAND memory 4 into the RAM 2 at a predetermined timing (for example, at start-up), and stores the block management table 21 within the RAM 2 in the NAND memory 4 at a predetermined timing. The controller 3 performs data transfer through the RAM 2 between the host device 10 and the NAND memory 4.

The controller 3 uses the block management table 21 to control the RAM 2 and the NAND memory 4 so as to perform data read/write control on the NAND memory 4.

The controller 3 of this embodiment includes a block manager 31 and a compaction controller 32. The block manager 31 performs data management in the RAM 2 and the NAND memory 4 based on the block management table 21 while updating the block management table 21 with the RAM 2 and the NAND memory 4 at the time of the data transfer.

The compaction controller 32 uses the block management table 21 to perform compaction. Specifically, the compaction controller 32 selects a block with a low immediately-previous invalid cluster count based on the block management table 21 and uses the selected block to perform compaction. The compaction controller 32 may select a block that has a low valid cluster count and a low immediately-previous invalid cluster count, as a compaction target. The compaction controller 32 executes compaction in the NAND memory 4 in the case where the number of data-writable blocks becomes equal to or less than a predetermined number.

The compaction controller 32 stores, for example, the old block management table 21 used at compaction a predetermined times before in a predetermined storage area. Subsequently, the compaction controller 32 compares the valid cluster count stored within the latest block management table 21 with the valid cluster count stored within the block management table 21 used at the time of old compaction before the predetermined number of compactions. Subsequently, the compaction controller 32 registers the immediately-previous invalid cluster count within the latest block management table 21 based on the comparison result (the difference between the valid cluster counts).

The compaction controller 32 may register, on the block management table 21, the number of immediately-previous invalid clusters in which the elapsed time after invalidation is within a predetermined time among the clusters as the immediately-previous invalid cluster count.

The compaction controller 32 selects, for example, a block with a lower immediately-previous invalid cluster count than a predetermined number, as a compaction target. Thus, the compaction controller 32 excludes a block with a higher immediately-previous invalid cluster count than the predetermined number from the compaction targets. Specifically, the compaction controller 32 selects a block in which the maximum consecutive number (the maximum value of the consecutive numbers) or the total number of the immediately-previous invalid cluster counts within the block is lower than a predetermined number, as a compaction target.

The compaction controller 32 may add weights to the valid cluster count and the immediately-previous invalid cluster count, and then select a block of the compaction target based on the valid cluster count and the immediately-previous invalid cluster count. In this case, the compaction controller 32 preferentially selects, for example, a block with a small value of X1 expressed by the following formula (1) as the compaction target.

$$X1 = A \times (\text{the valid cluster count}) + B \times (\text{the immediately-previous invalid cluster count}) \quad (1)$$

Here, the values of A and B are, for example, any values in the sum of 1 (A+B=1). Accordingly, X1 becomes a weighted mean (a weighted arithmetic mean).

The compaction controller 32 may register the immediately-previous invalid cluster count for each elapsed time after invalidation on the block management table 21. In this case, focusing on the fact that compaction is executed approximately at constant time intervals in any of the blocks included in the NAND memory 4, the compaction controller 32 may employ the number of compactions executed in any part of the NAND memory 4 instead of the elapsed time. For example, the compaction controller 32 may register, on the block management table 21, the number of clusters where the number of compactions that have occurred in any part of the NAND memory 4 after invalidation is within a first number (a first immediately-previous invalid cluster count) and the number of clusters where the number of compactions that have occurred in any part of the NAND memory 4 after invalidation is within a second number (a second immediately-previous invalid cluster count). In this case, the first immediately-previous invalid cluster count and the second immediately-previous invalid cluster count are the invalid cluster counts with respect to the same block. In the block management table 21, the first immediately-previous invalid cluster count and the second immediately-previous invalid cluster are registered for each block.

In this case, the compaction controller 32 may add weight to each immediately-previous invalid cluster count and then select a block of the compaction target based on the valid cluster count and the immediately-previous invalid cluster count. The compaction controller 32 preferentially selects, for example, a block with a small value of X2 expressed by the following formula (2) as the compaction target.

$$X2=(B1\times(\text{the first immediately-previous invalid cluster count})+B2\times(\text{the second immediately-previous invalid cluster count})) \quad (2)$$

In this case, in the case where the first number is lower than the second number, the clusters counted as the first immediately-previous invalid cluster count have a higher likelihood of being invalidated compared with the clusters counted as the second immediately-previous invalid cluster count. In other words, a cluster with a shorter length of the elapsed time after invalidation has high likelihood of being invalidated. Accordingly, in the compaction controller 32, the formula (2) is set to satisfy B1>B2.

The compaction controller 32 may further register, on the block management table 21, the number of clusters (the third to N-th immediately-previous invalid cluster counts) that is the number of compactions that have occurred in any part of the NAND memory 4 after the invalidation and is the third to N-th number (where N is a natural number equal to or more than 3), for each block. Also in this case, the compaction controller 32 adds more weight to a cluster with a shorter length of the elapsed time after invalidation, and then selects a block of the compaction target.

For example, in case of writing data into the NAND memory 4, the controller 3 refers to the block management table 21 so as to select an unused valid block (a writable block). Subsequently, the controller 3 writes data specified by a logical address to the selected block. The logical address employs, for example, a logical block address (LBA) in which consecutive numbers from 0 are given to logical capacity in the unit of sector.

The SSD 1 receives read/write instructions from the host device 10 through an interface (not illustrated). The interface between the host device 10 and the SSD 1 is compliant to, for example, a serial ATA (SATA) standard, but is not limited to this.

The NAND memory 4 is non-volatile semiconductor memory such as NAND-type flash memory. The NAND memory 4 includes a memory cell array and a peripheral circuit. In the memory cell array, a plurality of non-volatile memory cells is arranged in a matrix. The peripheral circuit is used for controlling write, read, and erase operations with respect to the memory cell array. The memory cell array is constituted such that a plurality of blocks as the minimum unit of data erase is arrayed. Each block is constituted such that a plurality of pages as the minimum unit (size) of data write and read is arrayed. Each memory cell may be configured to store 1 bit or may be configured to store 2 bits or more. In the NAND memory 4, rewrite to the same page within a block is not permitted until after the entire block that includes this page is once erased.

The controller 3 may couple to external ROM (not illustrated). This ROM stores, for example, a firmware. The firmware issues a read command and a write command to the NAND memory 4.

The firmware is assumed to operate by deploying content programmed in the ROM onto the RAM 2 at start-up of a system power supply. The firmware uses a logical block address to access to the NAND memory 4.

Figure 2:
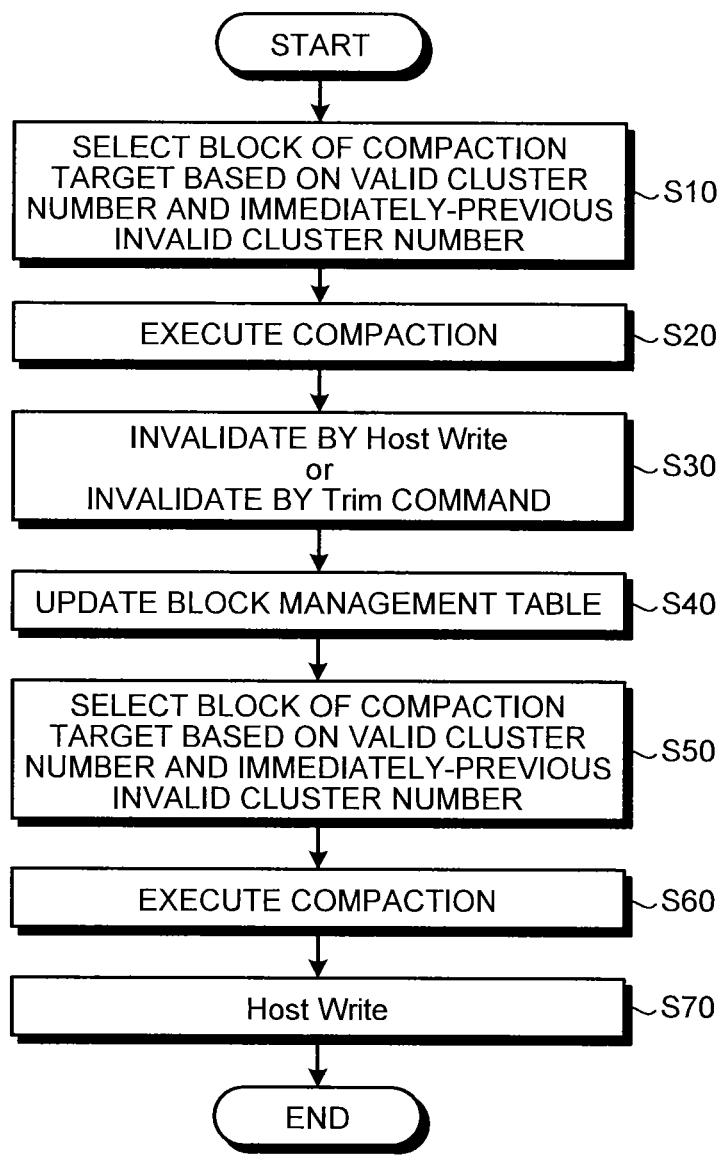
FIG. 2 is a flowchart illustrating a procedure of compaction according to the embodiment.

Next, a description will be given of a procedure of the compaction according to the embodiment. FIG. 2 is a flowchart illustrating the procedure of the compaction according to the embodiment. The SSD 1 repeats writing and compaction of data with respect to the NAND memory 4.

When the controller 3 writes data to the NAND memory 4, the controller 3 converts a logical block address of a write target into a physical block address so as to write the data to the NAND memory 4. When the controller 3 invalidates data on the NAND memory 4, the controller 3 converts a logical block address of an invalidation target into a physical block address so as to invalidate the data on the NAND memory 4. Accordingly, data is updated on the NAND memory 4.

The compaction controller 32 updates the block management table 21, and then selects a block to be a compaction target based on the block management table 21. At this time, the compaction controller 32 selects the block to be the compaction target based on the immediately-previous invalid cluster count within the block management table 21 (in step S10). Subsequently, the compaction controller 32 uses the selected block to execute compaction (in step S20).

In the SSD 1, data may be invalidated by overwriting to an LBA (Host Write) or data may be invalidated by a Trim command (in step S30). The Trim command is a command for converting data that is invalid in the host device 10 but valid in the SSD 1 into data invalid in both the host device 10 and the SSD 1.

In the case where data is invalidated by the Host Write or the Trim command, a table for converting a logical address and a physical address on the NAND memory 4 is updated. When data is updated on the NAND memory 4, the block manager 31 updates the block management table 21 (in step S40).

Here, a configuration of the block management table 21 will be explained. FIG. 3 is a diagram illustrating an exemplary configuration of the block management table. In the block management table 21, the Block Number, the valid cluster count, and the immediately-previous invalid cluster count are associated with one another. For example, FIG. 3 illustrates the case where a block with the Block Number of "1" has the valid cluster count of "a1" and the immediately-previous invalid cluster count of "b1". The immediately-previous invalid cluster count in the block management table 21 is information related to likelihood that valid data within a block is invalidated.

In the case where the block manager 31 does not use the valid cluster count to select the compaction target, the block management table 21 needs not store the valid cluster count.

The compaction controller 32 updates the block management table 21, and then selects a block to be a compaction target based on the block management table 21. At this time, the compaction controller 32 selects a block as a compaction target based on the immediately-previous invalid cluster count within the block management table 21 (in step S50).

Accordingly, the compaction controller 32 of this embodiment can select a block to be a compaction target based on a data state (the number of immediately prior clusters that have been invalid and similar data) within the NAND memory 4 corresponding to the Host Write or the Trim command. In other words, the compaction controller 32 can select a block reflecting a trend of data invalidation in step S30 as the compaction target.

The compaction controller 32 selects a block to be a compaction target, and then uses the selected block to execute compaction (in step S60). Subsequently, the SSD 1 continues a process that invalidates data due to overwriting to the LBA (Host Write) and similar process (in step S70). The compaction controller 32 may select a block to be a compaction target based on both the valid cluster count and the immediately-previous invalid cluster count.

Figure 4:
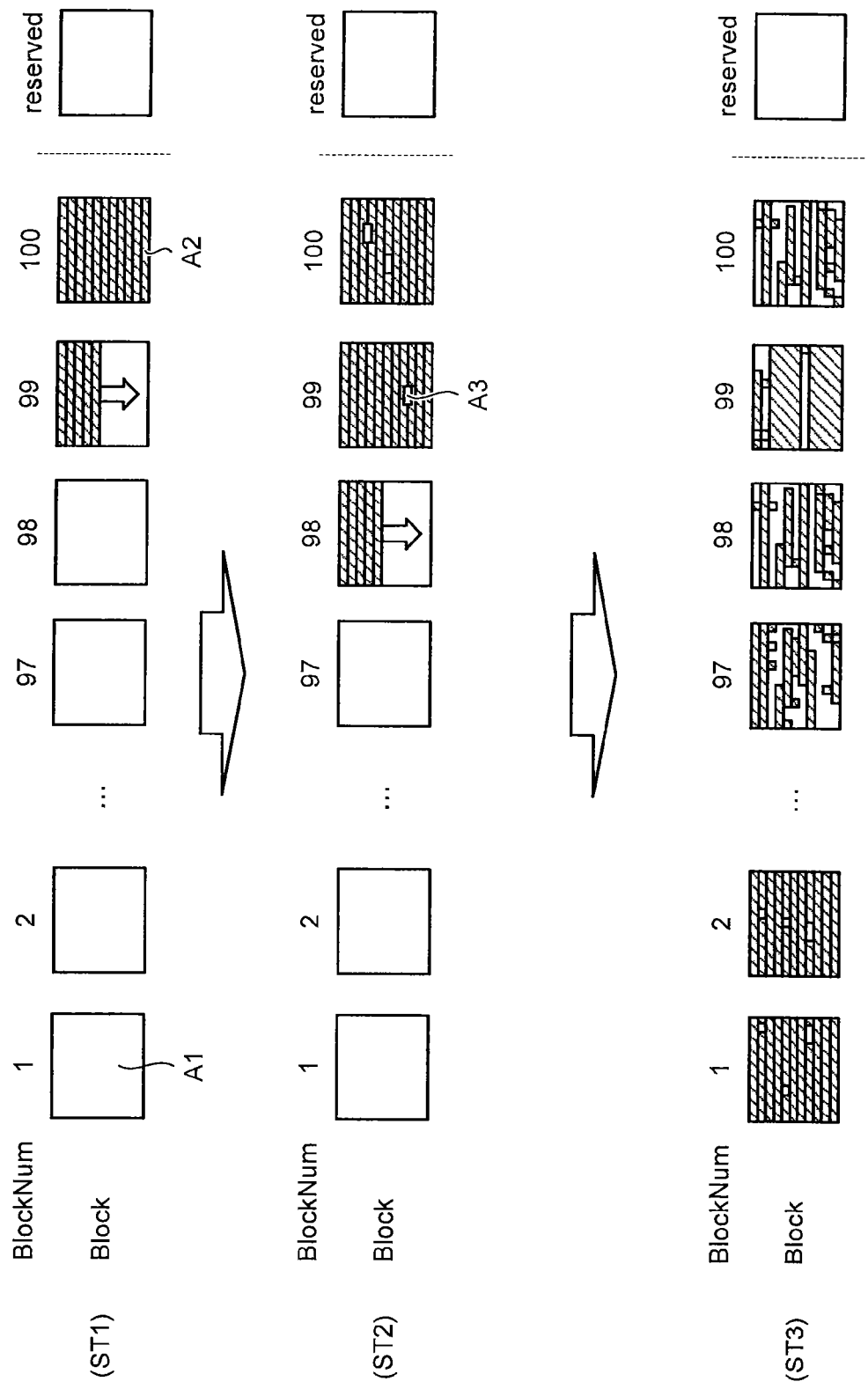
FIG. 4 is a diagram illustrating a state of a NAND memory requiring compaction.

Next, a description will be given of a state of the NAND memory 4 requiring compaction. FIG. 4 is a diagram for describing the state of the NAND memory requiring compaction. Hereinafter, a description will be given of the case where the NAND memory 4 includes 101 blocks and one of the blocks is a reserved block. Here, the block used for selection determination of the compaction target may be a physical block or a logical block (a block logically formed of a plurality of physical blocks).

FIG. 4 illustrates a data storage status of each block is illustrated by a bit map table. The bit map table indicates a valid or invalid state of the data for each cluster. In the SSD 1, one block is configured by a plurality of clusters with predetermined sizes.

In the bit map table, the valid or invalid state is updated when data write to the NAND memory 4 occurs. The firmware executes write operation using the LBA. Therefore, in the case where data is actually written to the NAND memory 4, the firmware converts an LBA into a physical address (a block address, a cluster address) to write data.

Assume that in the SSD 1, for example, the data is written in an order from the block with the highest Block Number (in ST1). In each block, a region where data is unwritten is a cluster region A1 and a region where data has been written is a cluster region A2.

In this case, the SSD 1 may invalidate data due to overwriting to the LBA (Host Write) or may invalidate data due to the Trim command (in ST2). In each block, a region where data is invalidated is a cluster region A3.

In the case where the SSD 1 continues data write to each block, data is written to all blocks with the Block Numbers 1 to 100 (in ST3). Thus, the blocks of the SSD 1 are run through, except for the reserved block. In this case, the SSD 1 organizes the data within the block and creates a free block. This process that creates a free block is the compaction.

Figure 5:
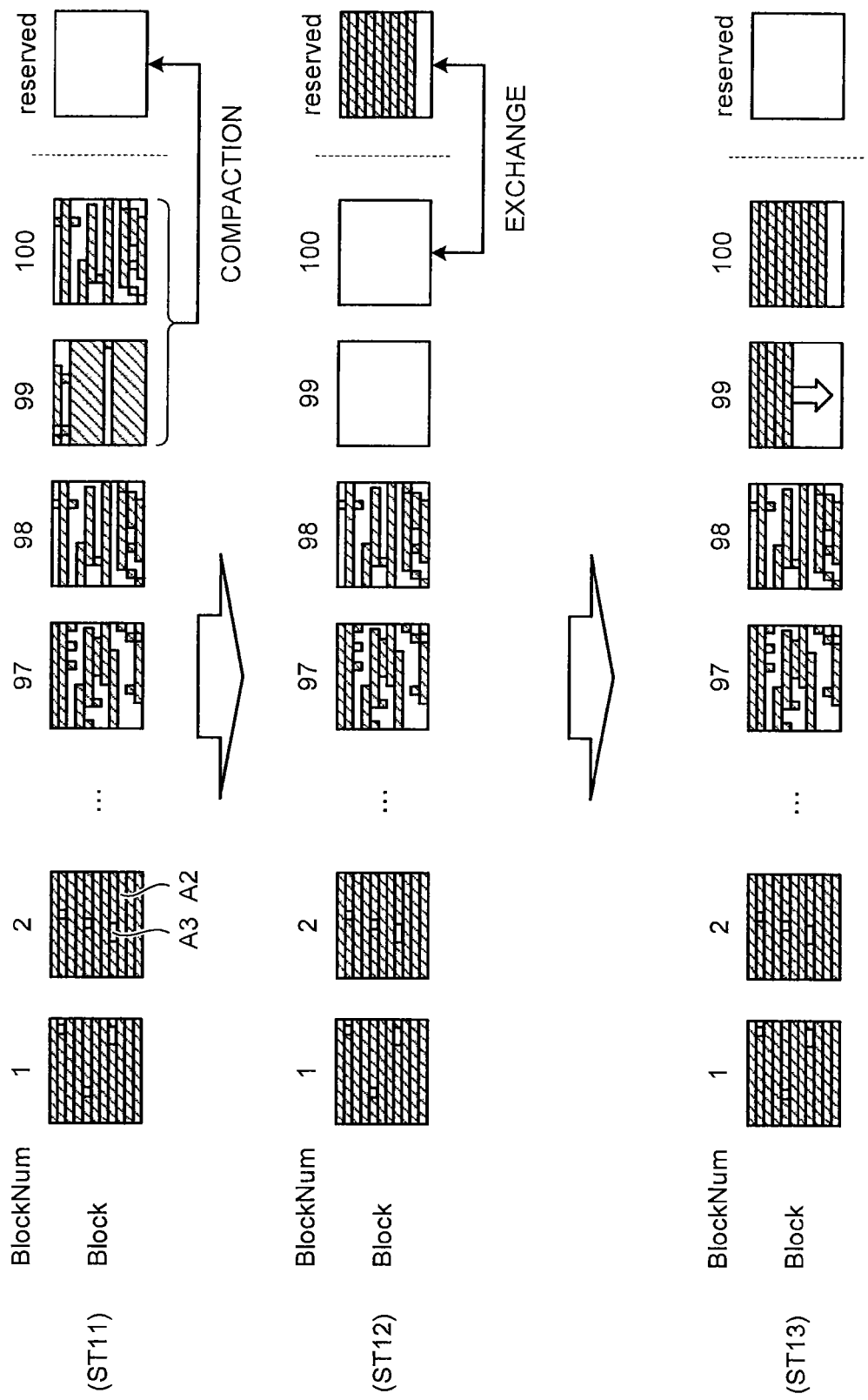
FIG. 5 is a diagram for describing the procedure of the compaction.

Next, a description will be given of a procedure of the compaction. FIG. 5 is a diagram for describing a procedure of the compaction. Here, a description will be given of the case where the blocks with the Block Numbers 99 and 100 are compaction targets. Hereinafter, a description will be given assuming that a block with a Block Number A (where A=1 to 100) is a block A.

The compaction controller 32 stores data within the blocks 99 and 100 in the reserved block (in ST11). In other words, the compaction controller 32 rewrites the data within the blocks 99 and 100 to the reserved block as a new block (collects the valid data into one group).

At this time, the compaction controller 32 sequentially stores the data within the reserved block not to have the cluster region A3. The compaction controller 32 stores all the data within the blocks 99 and 100 in the reserved block, and then erases the data within the blocks 99 and 100. Accordingly, the blocks 99 and 100 become data-writable blocks.

The compaction controller 32 exchanges any one block (here, the block 100) of the blocks 99 and 100 for the reserved block (in ST12). Accordingly, the block 100 becomes a state storing the data of the reserved block and the reserved block becomes a data-writable state. Subsequently, the SSD 1 uses the data-writable block 99 to restart data write (in ST13).

Figure 6:
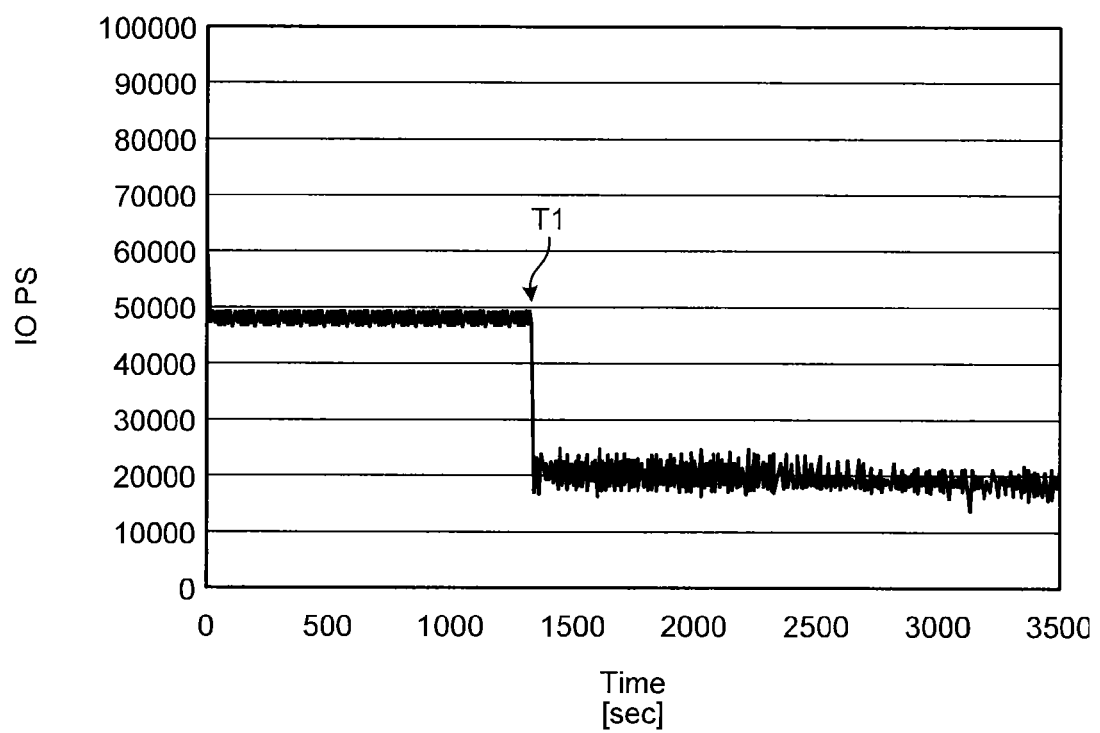
FIG. 6 is a diagram for describing performance degradation during execution of the compaction.

Incidentally, in the SSD 1, the performance is degraded during execution of the compaction. FIG. 6 is a diagram for describing performance degradation during execution of the compaction. In the graph illustrated in FIG. 6, the horizontal axis denotes time (progress of the process) and the vertical axis denotes input/output per second (IOPS).

As illustrated in FIG. 6, the IOPS is about 50000 times before execution of the compaction while the IOPS is reduced to about 20000 times from timing T1 at which the compaction is started. Accordingly, the IOPS is considerably degraded when the compaction is started. This is because the controller 3 is devoted to the process of the compaction. That is, while the controller 3 is executing compaction, the controller 3 is occupied with reading operations and writing operations. This degrades the performance of the SSD 1. Subsequently, when the compaction terminates, the IOPS recovers to about 50000 times (not illustrated).

Thus, in the SSD 1, data movement (copy) due to the compaction is preferred to be less frequent as much as possible. Efficiently moving (rewriting) data is important to prevent the performance degradation of the SSD 1.

Figure 7:
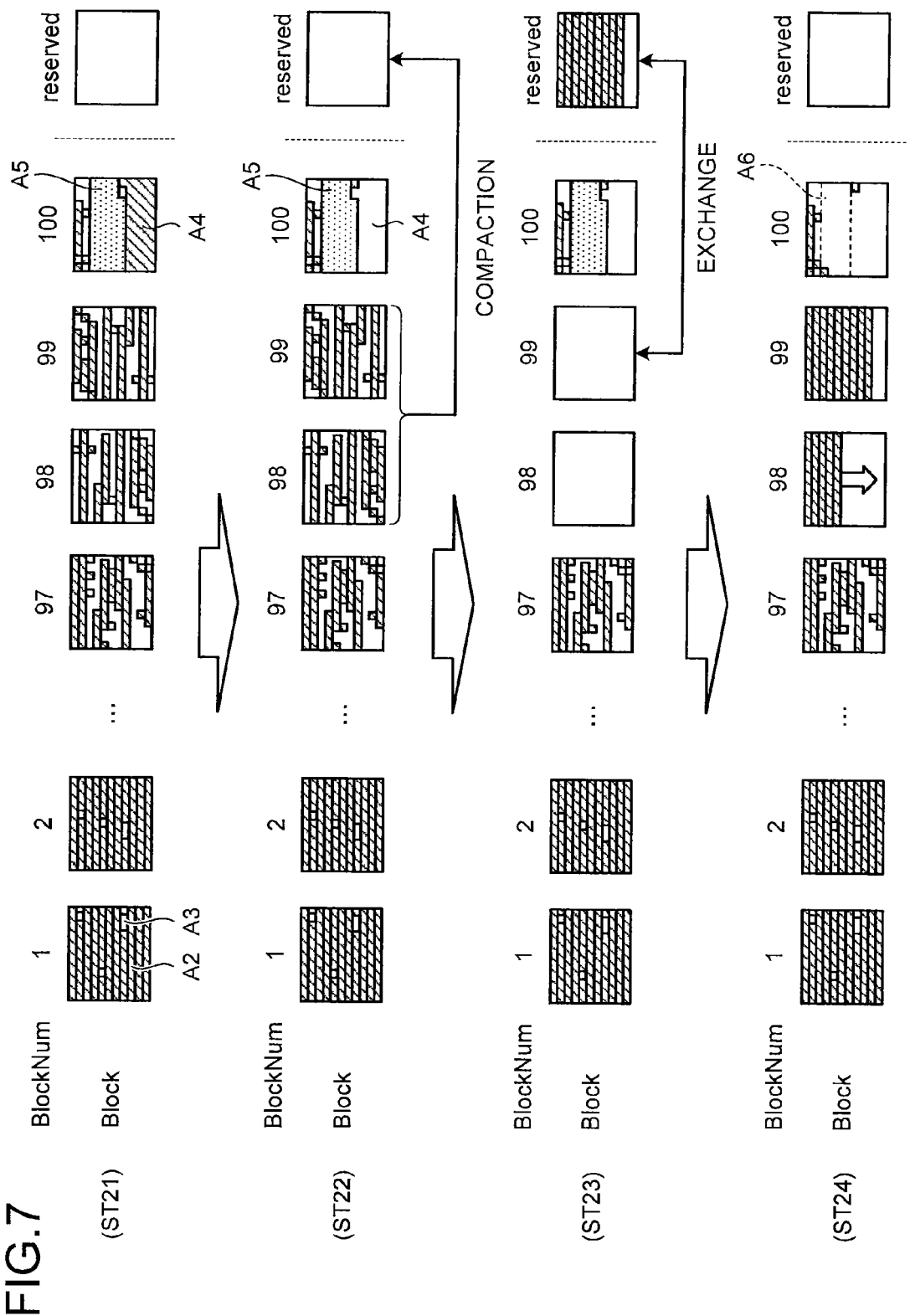
FIG. 7 is a diagram for describing a compaction-block selection process in the case where a block with a cluster that is likely to be invalidated is excluded from compaction targets.

Next, a description will be given of a process that selects a block as a compaction target. This embodiment excludes a block with a cluster that is likely to be invalidated from the compaction targets. FIG. 7 is a diagram for describing a compaction-block selection process in the case where a block with a cluster that is likely to be invalidated is excluded from the compaction targets.

In the SSD 1, a lot of data may be collectively invalidated immediately before the compaction is performed. In FIG. 7, in each block, a region that stores a cluster invalidated immediately prior to the compaction (the immediately-previous invalid cluster) is indicated as a cluster region A4 (in ST21).

In the case where the compaction is performed in the SSD 1, the compaction controller 32 selects a block to be a compaction target from the blocks 1 to 100. For example, the compaction controller 32 excludes a block in which the immediately-previous invalid cluster count is higher than a predetermined number, and then selects a block with a low valid cluster count as a block of the compaction target.

For example, the cluster region A4 stores the immediately-previous invalid cluster. Therefore, a cluster with high likelihood of being invalidated next may be stored in an adjacent region (for example, a nearest address) to the cluster region A4. In FIG. 7, in each block, the region that stores the cluster with high likelihood of being invalidated next is illustrated as a cluster region A5.

The compaction controller 32 selects, for example, the blocks 98 to 100 with low valid cluster counts. Furthermore, the compaction controller 32 selects the blocks 98 and 99 with low immediately-previous invalid cluster counts from the selected blocks. Subsequently, the compaction controller 32 performs compaction using the selected blocks 98 and 99 (in ST22).

The compaction controller 32 stores data within the blocks 98 and 99 in the reserved block. When the compaction controller 32 stores all the data within the blocks 98 and 99 in the reserved blocks, the compaction controller 32 erases the data within the blocks 98 and 99. Accordingly, the blocks 98 and 99 become data-writable blocks.

The compaction controller 32 exchanges any one block (here, the block 99) of the blocks 98 and 99 for the reserved block (in ST23). Accordingly, the block 99 becomes a state storing the data of the reserved block and the reserved block becomes a data-writable state. Subsequently, the SSD 1 uses the data-writable block 98 to restart data write (in ST24).

Subsequently, data of the cluster region A5 adjacent to the cluster region A4 that stores the immediately-previous invalid cluster might be actually invalidated. Here, the block 100 includes an invalidated cluster region A6 as a region corresponding to the cluster region A5. Even in this case, the block 100 is excluded from the compactions and does not hinder efficient execution of the compaction.

Next, a description will be given of a process in the case where a block of the compaction target is selected without excluding the block with the cluster that is likely to be invalidated from the compaction targets. FIG. 8 is a diagram for describing the compaction-block selection process in the case where the block with the cluster that is likely to be invalidated is not excluded from the compaction targets.

In FIG. 8, similarly to FIG. 7, in each block, a region that stores a cluster invalidated immediately prior to the compaction (the immediately-previous invalid cluster) is illustrated as the cluster region A4. In FIG. 8, in each block, a region that stores a cluster with high likelihood of being invalidated next is illustrated as the cluster region A5. Here, a block with a low valid cluster count is selected as a block of the compaction target from the blocks 1 to 100. For example, the blocks 99 and 100 with low valid cluster counts are selected. Subsequently, the selected blocks 99 and 100 are used to perform compaction (in ST31).

Accordingly, data within the blocks 99 and 100 is stored in the reserved block (in ST32). When all the data within the blocks 99 and 100 is stored in the reserved block, the data within the blocks 99 and 100 is erased. Accordingly, the blocks 99 and 100 become data-writable blocks.

Subsequently, in the reserved block, the data of the cluster region A5 adjacent to the cluster region A4 that stores the immediately-previous invalid cluster might be actually invalidated. In this case, the reserved block includes the invalidated cluster regions A6 as a region corresponding to the cluster region A5 even immediately after the compaction.

Subsequently, any one block (here, the block 100) of the blocks 99 and 100 are exchanged for the reserved block (in ST33). Accordingly, the block 100 becomes a state storing the data of the reserved block and the reserved block becomes a data-writable state.

Subsequently, the data-writable block 99 is used to restart data write. However, the block 100 includes the invalidated cluster region A6 even immediately after the compaction, thus becoming a compaction target. This shows the block 100 is unsuitable as the compaction target to reduce the number of compactions.

That is, when compaction is performed on the data with high likelihood of being invalidated, data collected in consecutive regions (data on which the compaction is performed) becomes data with high likelihood of being invalidated next. In this case, there is high likelihood that the data collected in the consecutive regions is shortly invalidated and inconsecutive regions occur.

In contrast, in the method described in FIG. 7, the compaction controller 32 excludes the block 100 with the cluster region A5 from the compaction targets. This reduces the number of compactions.

The compaction controller 32 may use the bit map table illustrated in FIG. 7 or similar instead of the block management table 21 to select the block of the compaction target.

The compaction controller 32 may select the block to be the compaction target based on the cluster count of the cluster that has a shorter time period until period of validity (validation time) (period to be treated the stored data is valid) has expired (a data holding period) than a predetermined time. In this case, the block management table 21 associates the cluster count (the short-term cluster count) of the clusters (short-term clusters) that has the shorter time period until the period of validity has expired than the predetermined time, the block number, and the valid cluster count with one another. Here, the period of validity is set by the host device 10. Regarding a valid cluster with a set period of validity, the valid cluster can be handled as an invalid cluster when time set by the period of validity has elapsed.

Thus, the embodiment selects the block of the compaction target based on the immediately-previous invalid cluster count in each block, thus reducing the number of compactions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
   non-volatile memory that includes a plurality of blocks as a unit of data erase, each one of the plurality of blocks including a plurality of pages as a unit of data write and read;
   a block management table that stores whether data in the non-volatile memory is valid or invalid in a unit of cluster, the cluster being natural number times as large as a unit of sector, the natural number being equal to or more than two, the unit of sector being a minimum access unit from a host, a size of the cluster being smaller than a size of the block; and
   a controller configured to:
      manage data stored in the non-volatile memory based on the block management table; and
      execute compaction based on the block management table, the compaction being a process that reads out a valid cluster from the block and rewrites the valid cluster to an erased block, wherein
   in the block management table, for each of the blocks, first information related to the likelihood that valid data within the block is invalidated is registered, and
   the controller is configured to select a block to be a target of the compaction based on the first information and use the selected block to execute the compaction.

2. The memory system according to claim 1, wherein
   in the block management table, for each of the blocks, an immediately-previous invalid cluster count is registered as the first information, the immediately-previous invalid cluster count being a number of invalid clusters that become invalid within a predetermined time period immediately prior to the compaction in the block among the clusters, and
   the controller is configured to select the block to be the target of compaction based on the immediately-previous invalid cluster count.

3. The memory system according to claim 2, wherein
   in the block management table, for each of the blocks, a valid cluster count is further registered, the valid cluster count being a number of clusters in which valid data is stored, and
   the controller is configured to select the block to be the target of compaction based on both the valid cluster count and the immediately-previous invalid cluster count.

4. The memory system according to claim 1, wherein
in the block management table, for each of the blocks, a short-term cluster count is registered as the first information, the short-term cluster count being a number of clusters in which a time period until validation time has expired is shorter than a predetermined time, and
the controller is configured to select the block to be the target of compaction based on the short-term cluster count.

5. The memory system according to claim 4, wherein
in the block management table, for each of the blocks, a valid cluster count is further registered, the valid cluster count being a number of clusters in which valid data is stored within the block among the clusters, and
the controller is configured to select the block to be the target of compaction based on both the valid cluster count and the short-term cluster count.

6. The memory system according to claim 1, wherein
in the block management table, for each of the blocks, a number of clusters that are included in the block and each have an elapsed time after invalidation within a predetermined time period is registered as the first information.

7. The memory system according to claim 2, wherein
the controller includes a block manager configured to update the immediately-previous invalid cluster count on the block management table at a time of data transfer between the non-volatile memory and the host,
in the block management table, for each of the blocks, a valid cluster count is further registered, the valid cluster count being a number of clusters in which valid data is stored within the block, and
the block manager is configured to register a latest immediately-previous invalid cluster count in a latest block management table based on a comparison result between a valid cluster count registered on the block management table at compaction a predetermined times before and a valid cluster count registered in the latest block management table.

8. The memory system according to claim 7, wherein
the block manager is configured to update the block management table in a case where data is invalidated due to overwriting of data corresponding to an LBA or in a case where data within the block is invalidated due to a Trim command.

9. The memory system according to claim 2, wherein
the controller is configured to set a first block as the target of compaction, a number of the immediately-previous invalid clusters in the first block being smaller than a predetermined number.

10. The memory system according to claim 2, wherein
the controller is configured to set a second block as the target of compaction, a max count of a consecutive number of the immediately-previous invalid clusters in the second block being smaller than a predetermined number.

11. A controller, comprising:
a manager configured to manage data stored in non-volatile memory based on a block management table, the block management table storing whether data in the non-volatile memory is valid or invalid in a unit of cluster, the cluster being natural number times as large as a unit of sector, the natural number being equal to or more than two, the unit of sector being a minimum access unit from a host, a size of the cluster being smaller than a size of the block, the block being a unit of data erase of the non-volatile memory; and
a compaction controller configured to execute compaction based on the block management table, the compaction being a process that reads out a valid cluster from the block and rewrites the valid cluster to an erased block, wherein
the non-volatile memory includes a plurality of blocks as a unit of data erase, each one of the plurality of blocks including a plurality of pages as a unit of data write and read, and
in the block management table, for each of the blocks, first information related to likelihood that valid data within the block is invalidated is registered, and
the compaction controller is configured to select a block to be a target of the compaction based on the first information and use the selected block to execute the compaction.

12. The controller according to claim 11, wherein
in the block management table, for each of the blocks, an immediately-previous invalid cluster count is registered as the first information, the immediately-previous invalid cluster count being a number of invalid clusters that become invalid within a predetermined time period immediately prior to the compaction in the block among the clusters, and
the controller is configured to select the block to be the target of compaction based on the immediately-previous invalid cluster count.

13. The controller according to claim 11, wherein
in the block management table, for each of the blocks, a valid cluster count is further registered, the valid cluster count being a number of clusters in which valid data is stored, and
the controller is configured to select the block to be the target of compaction based on both the valid cluster count and the immediately-previous invalid cluster count.

14. The controller according to claim 11, wherein
in the block management table, for each of the blocks, a short-term cluster count is registered as the first information, the short-term cluster count being a number of clusters in which a time period until validation time has expired is shorter than a predetermined time, and
the controller is configured to select the block to be the target of compaction based on the short-term cluster count.

15. The controller according to claim 11, wherein
in the block management table, for each of the blocks, a valid cluster count is further registered, the valid cluster count being a number of clusters in which valid data is stored within the block among the clusters, and
the controller is configured to select the block to be the target of compaction based on both the valid cluster count and the short-term cluster count.

16. A control method of a memory system, comprising:
storing data in accordance with an instruction from a host by non-volatile memory, the non-volatile memory including a plurality of blocks as a unit of data erase, each one of the plurality of blocks including a plurality of pages as a unit of data write and read; and
managing data within the non-volatile memory by a controller based on a block management table that stores whether data in the non-volatile memory is valid or invalid in a unit of cluster, the cluster being natural number times as large as a unit of sector, the natural number being equal to or more than two, the unit of sector being a minimum access unit from a host, a size of the cluster being smaller than a size of the block, wherein the controller executes compaction based on the block management table, the compaction being a process that reads out a valid cluster from the block and rewrites the valid cluster to an erased block, in the block management table, for each of the blocks, first information related to a degree of likelihood that data within the block is invalidated is registered, and the controller is configured to select a block to be a target of the compaction based on the first information and use the selected block to execute the compaction.

17. The control method of the memory system according to claim 16, wherein in the block management table, for each of the blocks, an immediately-previous invalid cluster count is registered as the first information, the immediately-previous invalid cluster count being a number of invalid clusters that become invalid within a predetermined time period immediately prior to the compaction in the block among the clusters, and the controller is configured to select the block to be the target of compaction based on the immediately-previous invalid cluster count.

18. The control method of the memory system according to claim 16, wherein in the block management table, for each of the blocks, a valid cluster count is further registered, the valid cluster count being a number of clusters in which valid data is stored, and the controller is configured to select the block to be the target of compaction based on both the valid cluster count and the immediately-previous invalid cluster count.

19. The control method of the memory system according to claim 16, wherein for each of the blocks, a short-term cluster count is registered as the first information, the short-term cluster count being a number of clusters in which a time period until validation time has expired is shorter than a predetermined time, and the controller is configured to select the block to be the target of compaction based on the short-term cluster count.

20. The control method of the memory system according to claim 16, wherein in the block management table, for each of the blocks, a valid cluster count is further registered, the valid cluster count being a number of clusters in which valid data is stored within the block among the clusters, and the controller is configured to select the block to be the target of compaction based on both the valid cluster count and the short-term cluster count.

* * * * *